United States Patent [19]
Moriguchi et al.

[11] 4,449,136
[45] May 15, 1984

[54] DRIVING SYSTEM FOR THERMAL RECORDING HEAD

[75] Inventors: Haruhiko Moriguchi; Takashi Ohmori, both of Kanagawa, Japan

[73] Assignee: Fuji Xerox Co., Ltd., Tokyo, Japan

[21] Appl. No.: 357,936

[22] Filed: Mar. 15, 1982

[30] Foreign Application Priority Data

Mar. 16, 1981 [JP] Japan .................................. 56-36498

[51] Int. Cl.³ .......................... G01D 15/10; H05B 3/00
[52] U.S. Cl. ................................. 346/76 PH; 219/216
[58] Field of Search .................. 400/120; 346/1.1, 76; 219/216 PH

[56] References Cited

U.S. PATENT DOCUMENTS 4,376,942 3/1983 Toth et al. .................. 219/216 PH

*Primary Examiner*—Donald A. Griffin
*Attorney, Agent, or Firm*—Sughrue, Mion, Zinn, Macpeak & Seas

[57] ABSTRACT

A thermal recording head driving system includes a device for maintaining the head at a substantially constant temperature between recording operations, the head however not being excited to an extent as could cause erroneous printing. The device is capable of preventing fluctuations in printing density owing to variations in the waste heat from the previous line recording operation.

9 Claims, 6 Drawing Figures

DRIVING SYSTEM FOR THERMAL RECORDING HEAD

BACKGROUND OF THE INVENTION

The present invention relates to a driving system for a thermal recording head as used in facsimile devices and so forth.

Particularly in digital facsimile, since the compressibility of information for transmission varies according to the original (manuscript), the driving period is not fundamentally constant at the recording means. The situation is as illustrated in FIG. 1. FIG. 1(A) represents the arrangement in time of each line information Vi (i= 1, 2, 3, . . .) in transmission. Information $V_1$ for the first line is transmitted at time $t_1$, information $V_2$ for the second line is transmitted at time $V_2$, and that for the n-th line is transmitted at time $t_n$. A receiver decodes and records each line signal $P_1, P_2, \ldots$ in constant time intervals $t_0$ as shown in FIG. 1(B). Thus, there arises an idle time between each line recording, for example up to the line signal $P_2$ after $P_1$ is recorded, and the idle time is not constant.

In a thermal recording where the idle time varies between each line recording as just mentioned, an unevenness in recording density follows, much as in other recording systems. The reason is that waste heat from the previous line recording is subjected to the influence of the idle time between each line recording, and the change in waste heat may exert an influence on the recording of the next line.

A conventional method of heating control comprises detecting the temperature of a head support on which a heating resistor is arranged, i.e. a dielectric substrate with a temperature detecting element like a thermistor, and controlling the energy to be impressed on the heating unit according to the detected temperature. However, this method is not satisfactory for improving the unevenness in density according to the change in waste heat. The reason is that it is difficult with respect to time and also with respect to temperature change, to detect the influence of the waste heat from the previous line recording operation according to the detected temperature of the dielectric substrate.

SUMMARY OF THE INVENTION

An object of the present invention is to provide a driving system for a thermal recorder which is easily and inexpensively made and is effective in improving the unevenness in recording density due to waste heat.

In a thermal recorder for which the recording timing for each line information is non-periodic, the invention includes a waste heat supplement signal generating means for periodically outputting a waste heat supplement signal at an idle time for each line recording, and a driver driven synchronously with the waste heat supplement signal, the thermal head being excited periodically with impressed energy to a degree so as not to cause recording during the idle time between recordings.

DETAILED DESCRIPTION OF THE PREFERRED EMBODIMENTS

Figure 2:
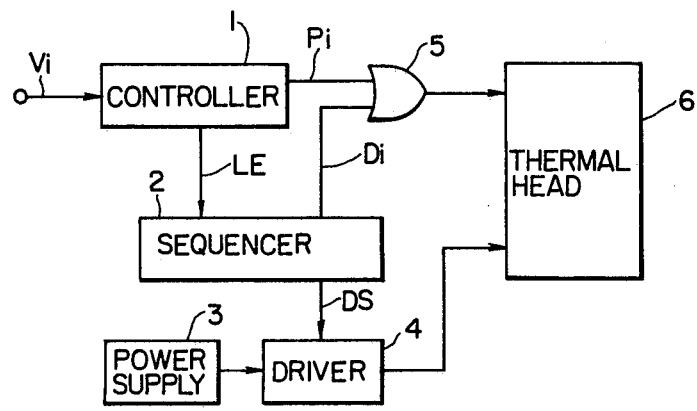
FIG. 2 is a block diagram representing one preferred embodiment of the invention.
Figure 3:
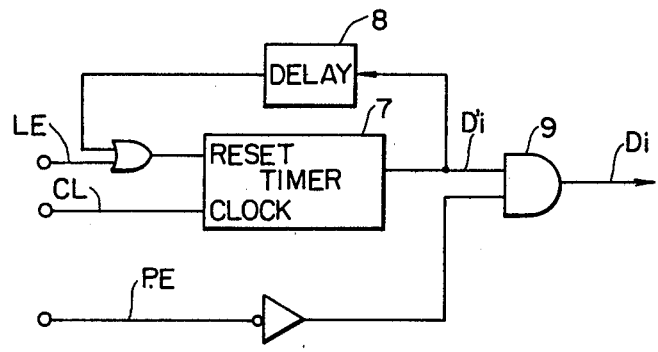
FIG. 3 is a circuit diagram representing one operative example of a waste heat supplement signal generating means.
Figure 4:
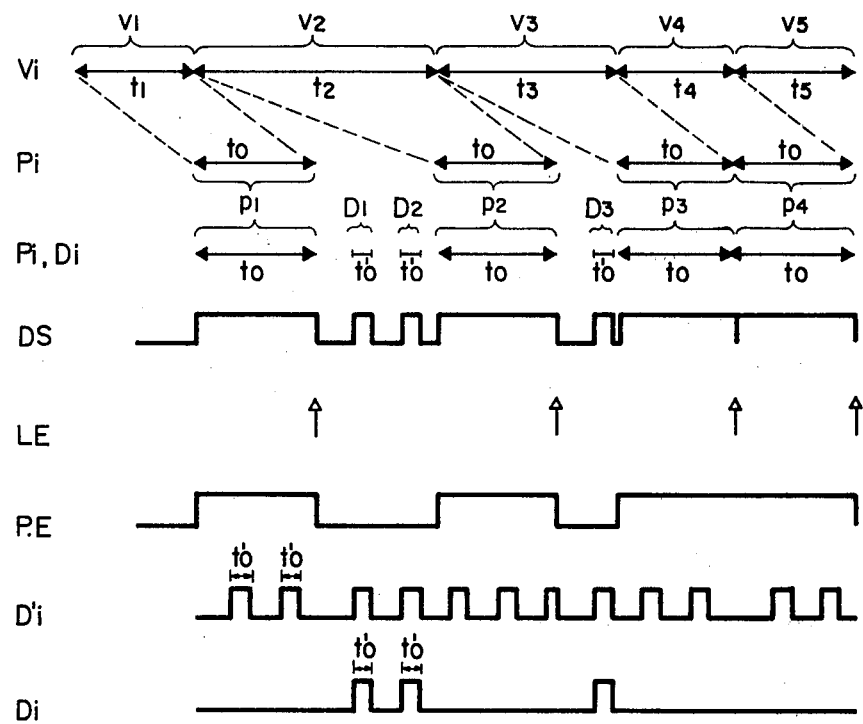
FIG. 4 is a wave-form diagram showing signals at various locations in FIGS. 2 and 3.

One preferred embodiment of the invention is represented in FIG. 2. In the drawing, 1 denotes a controller, 2 a sequencer, 3 a power supply, 4 a driver, 5 an OR circuit, and 6, a thermal head. A wasteheat supplement signal generating circuit including a timer 7, which is shown in FIG. 3, is incorporated in the sequencer 2. FIG. 4 represents wave forms at various locations in FIGS. 2 and 3.

Figure 1:
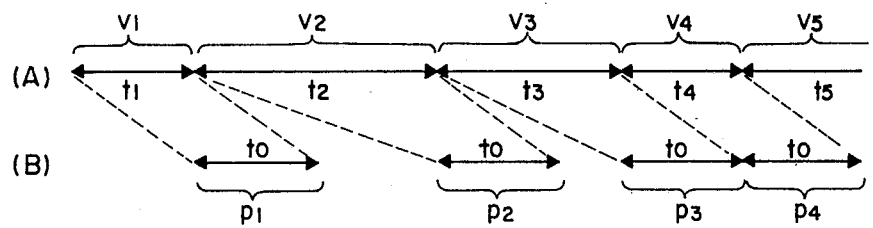
FIG. 1(A) is an explanatory diagram illustrating line information.
FIG. 1(B) is an explanatory diagram illustrating recording timing.

Continuous line information signals Vi (i= 1, 2, . . .) as shown in FIG. 1(A) or FIG. 4 are inputted at times ti to the controller 1. The line information signals Vi are decoded by the controller 1 for every line, and converted into line signals Pi, and a line end signal LE is outputted to the sequencer 2, as shown in FIG. 4, for every line.

When the line end signal LE is inputted to the sequencer 2, the timer 7 in the sequencer 2 (FIG. 3) is reset. Then, the timer 7 counts a given number of clock pulses CL and outputs a timer output D'i. Since the timer 7 is reset by the timer output D'i delayed for a time $t'_0$ by a delay circuit 8, an output D'i having a pulse width $t'_0$ is generated from the timer 7 at a constant period until the next line end signal LE is inputted. The timer output D'i and a print enable signal PE inverted by an inverter are inputted to an AND circuit 9, and a waste heat supplement signal Di is outputted from the AND circuit 9. The timing of the line end signal LE, print enable signal PE, timer output signal D'i and waste heat supplement signal Di are as shown in FIG. 4.

The line signal Pi outputted from the controller 1, and the waste heat supplement signal Di obtained as above are inputted to the thermal recording head 6, by way of the OR circuit 5, as heating element exciting signals. On the other hand, a drive start signal DS, shown in FIG. 4, is outputted from the sequencer 2 synchronously with the heating element exciting signal, and thus the driver 4 is driven according to the drive start signal DS. The drive start signal DS is obtainable, for example, through a logical sum of the print enable signal PE and the waste heat supplement signal Di. Electric energy from the power supply 3 is thus impressed on the thermal head 6. The heating element exciting signal is impressed on the thermal head 6 together with said electric energy, and the line signal Pi is thermally recorded.

The waste heat supplement signal Di may be a signal corresponding to total black, or one which is the same as the previous line signal or similar thereto. However, heating must be suppressed so as to keep the waste heat supplement signal Di from being recorded by the thermal head 6. In this embodiment, the pulse width of the waste heat supplement signal Di and the time $t'_0$ where the driver 4 is correspondingly driven are minimized to keep the waste heat supplement signal Di from being recorded.

As will be apparent from the above description, according to this embodiment, where there is an idle time between adjacent line signals Pi, the thermal head 6 is preheated during the idle time at constant intervals and for a given period of time, whereby if the idle time between each line signal Pi is uneven, the temperature of the thermal head can be almost uniformly maintained. Unevenness in the recording density will consequently not arise.

Figure 5:
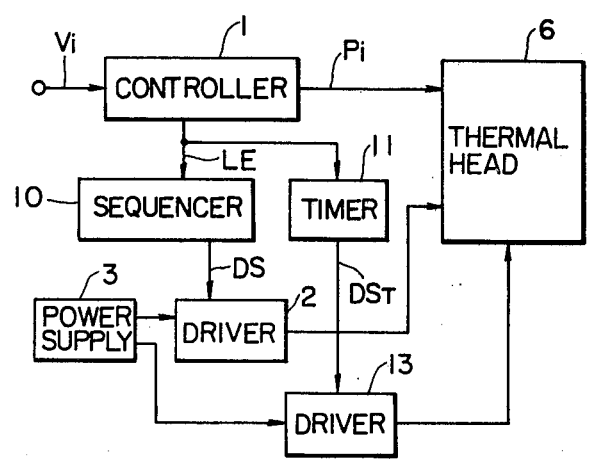
FIG. 5 is a block diagram illustrating a modification of the invention.

Another embodiment of the invention is shown in FIG. 5. In the drawing, 10 denotes a sequencer, 11 a timer, and 12, 13, drivers, other elements being the same as in FIG. 2. However, the thermal head 6 will be one in which lead electrodes are arranged alternately across the continuous heating unit. The timer 11 can be constituted by a circuit, for example, as shown in FIG. 3.

According to this embodiment, a drive start signal $DS_T$ (corresponding to Di of FIG. 3) is outputted periodically during the idle time between each line signal Pi. When the drive start signal $DS_T$ is outputted from the timer 11, the driver 13 is driven, and electric energy from the driver 13 is impressed between both ends of the continuous heating unit of the thermal head 6. Thus the substrate of the thermal head 6 is preheated periodically, and is maintained at an almost constant temperature, as in the first embodiment mentioned above, regardless of any unevenness in the idle time between each line signal Pi. The recording of the line signal Pi is the same as in the first embodiment, and the description thereof will be omitted.

As described, according to the invention, a constant waste heat is maintained on the thermal head at all times by periodically exciting the thermal head with energy, to a degree so as not to cause recording, during the idle time between each line signal, thereby securing recording of uniform density. Further, it becomes unnecessary to activate the heating unit and suddenly raise the temperature thereof, as is normally the case with conventional thermal recording heads. This feature is also advantageous in prolonging the useful life of the thermal recording head.

What is claimed is:

1. In a driving system for a thermal recording head, the timing of line information recording of which is non-periodic, the improvement comprising waste heat supplement signal generating means for periodically generating a waste heat supplement signal of uniform pulse width during an idle time between adjacent line recording operations, and a driver driven synchronously with said waste heat supplement signal, said thermal head being periodically excited with impressed energy to an extent so as not to cause recording during the idle time between line recording operations.

2. A driving system as claimed in claim 1, said waste heat supplement signal generating means comprising sequencer means including timer means.

3. A driving system as claimed in claim 2, further comprising controller means for receiving line information signals, and for outputting a line and signal at the end of each line to said sequencer, for resetting said timer means.

4. A driving system as claimed in claim 2, an output of said timer means and an inverted printing enabling signal being applied to gate means, an output of said gate means comprising said waste heat supplement signal.

5. A driving system as claimed in claim 4, further comprising a head power source, said sequencer outputting control signals to said head driver synchronously with the generation of said waste heat supplement signal, to thereby impress energy from said power source upon said head.

6. A driving system as claimed in claim 5, said waste heat supplement signal having a pulse width, and said driver being driven for a time, selected to be so short as to prevent said recording head from printing said waste heat supplement signal.

7. A driving system as claimed in claim 1, further comprising means for generating a drive start signal for controlling said head driver in synchronism with said waste heat supplement signal.

8. A driving system as claimed in claim 1, said waste heat supplement signal being periodically provided, and said driver being periodically driven, during said idle time in a manner so as to maintain a substantially constant waste heat on said thermal head.

9. A driving system as claimed in claim 1, said waste heat supplement signal generating means comprising timer means controlling operation of said driver; a sequencer controlling operation of a second driver, said sequencer and said timer receiving as inputs line end signals from controller means receiving line information signals.

* * * * *